Sept. 9, 1969 W. GLUCK 3,465,650
SHOCK ABSORBING MEANS FOR PISTON AND CYLINDER OR THE LIKE
Filed Jan. 16, 1967 4 Sheets-Sheet 1
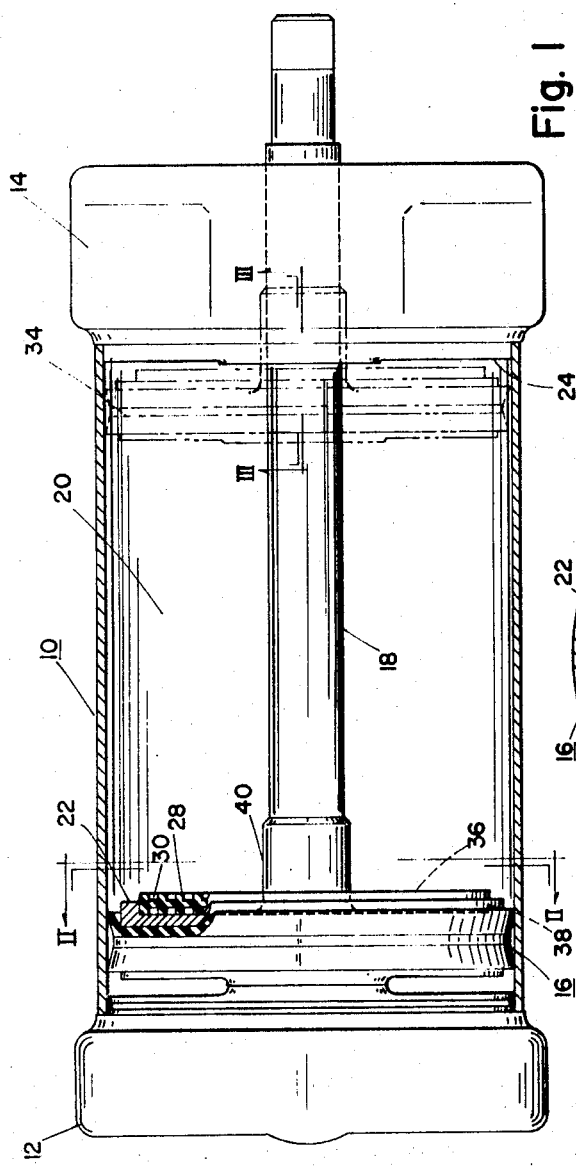
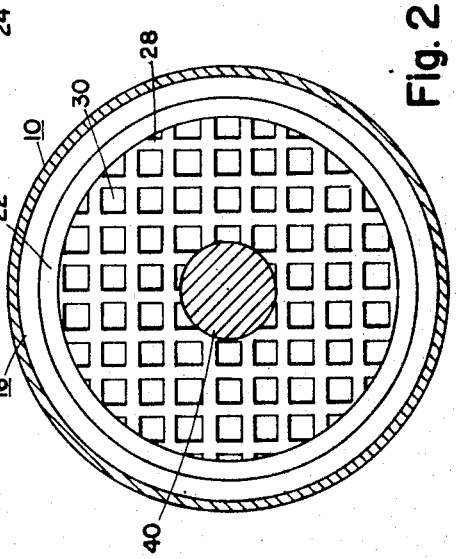
INVENTOR.
William Gluck Sept. 9, 1969  W. GLUCK  3,465,650
SHOCK ABSORBING MEANS FOR PISTON AND CYLINDER OR THE LIKE
Filed Jan. 16, 1967  4 Sheets-Sheet 2
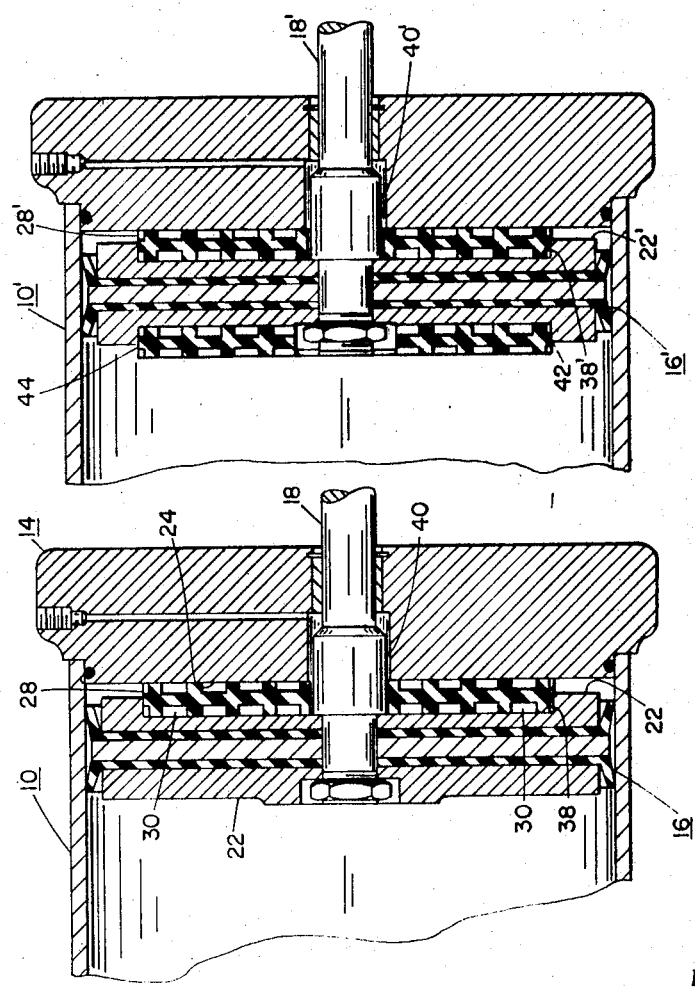
INVENTOR.
William Gluck Sept. 9, 1969 W. GLUCK 3,465,650
SHOCK ABSORBING MEANS FOR PISTON AND CYLINDER OR THE LIKE
Filed Jan. 16, 1967 4 Sheets-Sheet 3

INVENTOR.
William Gluck

Sept. 9, 1969 W. GLUCK 3,465,650
SHOCK ABSORBING MEANS FOR PISTON AND CYLINDER OR THE LIKE
Filed Jan. 16, 1967 4 Sheets-Sheet 4
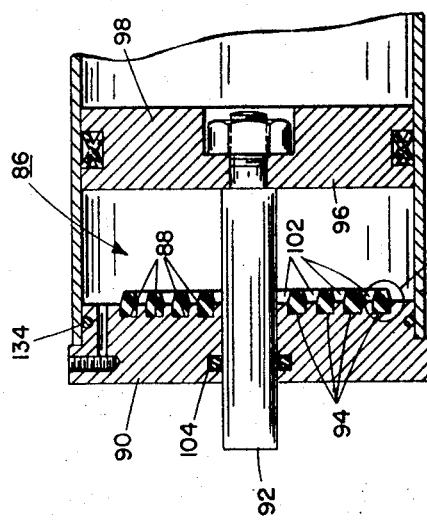
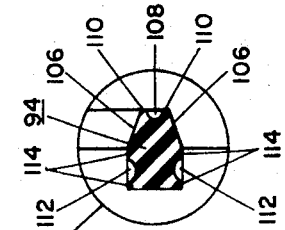
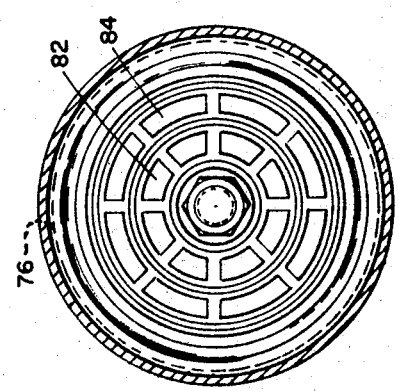
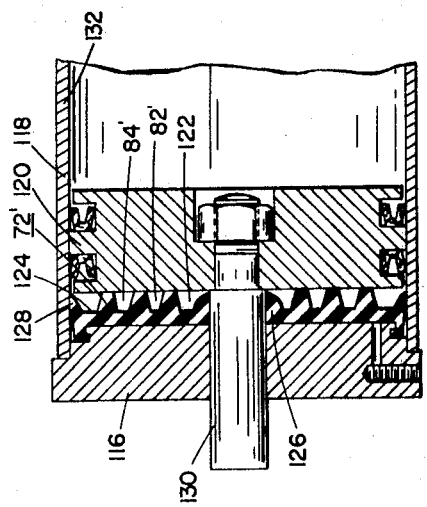
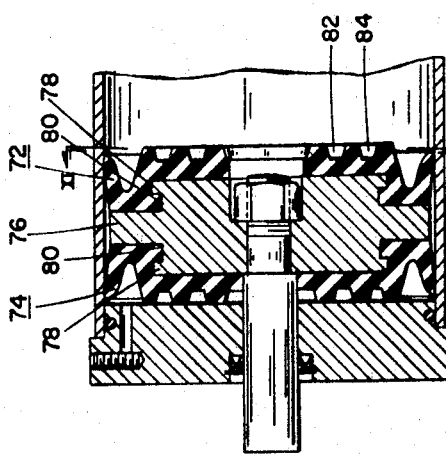
INVENTOR.
William Gluck

United States Patent Office 3,465,650
Patented Sept. 9, 1969

3,465,650
SHOCK ABSORBING MEANS FOR PISTON AND CYLINDER OR THE LIKE
William Gluck, Box 315, Monroeville, Pa. 15146
Filed Jan. 16, 1967, Ser. No. 609,630
Int. Cl. F01b *11/02;* F16j *15/56, 1/00*
U.S. Cl. 92—85               12 Claims

ABSTRACT OF THE DISCLOSURE

The shock absorbing means are useful between impacting machine elements such as a piston surface and either end of a cylinder. The shock absorbing means includes a resilient member having pockets or air spaces therein for entrapping fluid between the resilient member and the impacting surface of the machine element. The resiliency of the member permits engagement with the surface of the oncoming machine element to seal the pockets and prevent escape of the fluid. The entrapment of a compressible fluid in these pockets quickly absorbs the momentum of the impacting machine elements and brings the moving element to a stop within a very short distance after first engaging the shock absorbing means without imparting undue shock forces to either machine element. The shock absorbing means can be provided as a single member having pockets on either or both sides or as a plurality of discrete resilient members spaced to form pockets or grooves therebetween for entrapment of the fluid.

---

The present invention relates to shock absorbing means which are arranged for placement between or in the path of rigid machine elements to prevent violent and destructive or impacting contact therebetween. More particularly, the invention is directed to shock absorbing means of the character described which can be interposed between a piston and one or both inner-end wall surfaces of an associated cylinder to prevent the piston from slamming against one or both ends of the cylinder during operation of the piston and cylinder arrangement.

There are many applications throughout industry wherein it is desirable to prevent violent contact between two otherwise engageable machine components or the like, in order to prevent undue wear or fracture of the components or to eliminate attendant noise. In such situations, it has previously been the practice to employ conventional shock absorbers in the form of pneumatic or hydraulic cylinders, dash pots, crush tubes, shear pins and the like all of which present the obvious disadvantage respectively of a long deceleration or stopping throw or of one-shot useage. In the first instance, i.e., the relatively long stopping distance associated with dash-pot and piston-cylinder type shock absorbers, it is difficult if not impossible to accommodate the shock absorbers in compact equipment wherein space is at a premium. Moreover, considerable time delay occurs which is difficult to assess precisely and to compensate in accurately timed or programmed operations. With the advent of increasingly automated production equipment, such as automatic milling, casting, molding, and the like production machinery, it is of vital importance to control precisely the movements of the automated machinery and controls associated therewith. In such applications it has frequently been the practice to omit suitable shock absorbing means between many of the contacting and impacting machine elements, where such contact is not sufficiently violent to damage severely the machine elements. Accordingly, such elements have been subjected to unusual and undesirable wearing force which shortened the useful life of the machinery or which necessitated over-designing with attendant, increased costs.

In the case of crush tubes, shear pins and the like one-shot shock absorbers, their useage is obviously inappropriate in repetitive machinery.

Insofar as is known, there are no available shock absorbing means which can be conveniently inserted between machine elements for decelerating one or both of otherwise impacting machine elements within a very short distance or throw without damage to one or both of the machine elements. The desirability of providing such shock absorbing means is readily evident, however, particularly in those applications wherein space is at a premium as in most complicated machinery or in hydraulic or pneumatic piston-cylinder arrangements wherein it is not usually feasible to provide conventional shock absorbers without interfering with the operation of the piston and cylinder arrangements.

When the impacting machine elements are piston and cylinder arrangements, additional problems arise in moving heavy loads at high speeds. Thus it is difficult to prevent shock damage to the load, to the equipment on which the cylinder is mounted and to the cylinder itself. In such applications, it has been the practice to provide optional air cushions within the cylinder to slow the piston without impact at the end of the piston stroke. However, such air cushions are inadequate for stopping high inertial loads because of the air's compressibility. In most applications involving high inertial loads it has been necessary to utilize complicated and expensive hydraulic or mechanical shock absorbing systems for complete impact absorption at the end of the piston stroke. Such systems, in addition to being expensive to produce and to maintain, undesirably increase the bulk of the associated machinery.

In connection with presses or platens usually associated with various types of presses or molding machinery, extremely high loadings are encountered in connection with the toggle mechanisms frequently employed in these applications. When coupled to such toggle mechanism, a sudden release of energy is imparted to the piston and cylinder arrangement at or shortly before the piston reaches the end of its stroke. In such applications, conventional cylinder air cushions and ordinary elastomeric pads have been tried and found unable to absorb the high impact energies and to prevent cracking of the cylinder head impinged upon. Thus, there is no known shock absorbing means for such applications, which can be incorporated entirely with the cylinder, i.e., without substantially increasing the bulk thereof.

In connection with impact prevention in piston and cylinder arrangements, it has also been proposed to provide various types of bleed valves for the purpose of slowing the piston as it approaches either end wall of the cylinder. However, such valves require careful preliminary adjustment but do not maintain such adjustment during operation owing to erosion of the valve and the accumulation of dirt and other foreign matter therein. Moreover, the use of such bleed valves interferes with the timing of the piston and cylinder structures and thus minimizes the use of such structures in precision and/or pre-programmed machinery.

I overcome these difficulties and problems of the prior art by providing novel shock absorbing means which can be inserted between or in the path of impacting members or machine elements, or made an integral part thereof, so that the members are decelerated within a very short distance of their normal area or point of contact without destructive impact therebetween, and without significantly increasing the volume or area otherwise occupied by the impacting members. In one arrangement of my shock absorbing means, the latter are shaped for close fitting and sealing contact with one or both of the juxtaposable surfaces of the impacting elements. When the shock absorbing means of the invention are thus contacted by the approaching machine elements, means are associated with the shock absorbing means for entrapping and sealing a plurality of pockets of air or other environmental media between a surface of the shock absorbing means and the juxtaposed surface of at least one of the impacting machine elements.

These fluid-entrapping pockets for air or other such media co-act to cushion the impact between the approaching elements. The shock absorbing means are arranged so that the increasing pressures thereon effected by the impacting elements increasingly seal the pockets of the shock absorbing means therein to prevent or minimize the escape of air or other media therefrom. Thus, my shock absorbing means operate both to absorb the impacting energy of the elements and to bring the element to a stop within a very short distance from the point of initial engagement by the elements.

Desirably, my shock absorbing means are fabricated from elastomeric or other resilient material to facilitate the aforementioned sealing of the individual pockets with the surfaces of the impacting elements. In furtherance of this purpose the resilient material readily conforms itself to any relatively minor surface irregularities thereof or of the juxtaposed surfaces of the impacting elements, as the material is elastically deformed by forces developed by the approaching elements as they contact the shock absorbing means.

In another arrangement of my invention, both of the opposed surfaces of the shock absorbing means are provided with such pockets for air or other media so that pockets on each side of the shock absorbing means are engaged and sealed by forceful contact with the associated one of the approaching machine elements. In still other arrangements of my shock absorbing means, the latter are provided on one or both sides thereof with a waffle or grid-like pocket structure with the walls or partitions between or among the pockets or cells of the shock absorbing means being of appreciable width such that the resilient material of the shock absorbing means contributes absorption of impacting force and deceleration of one or both of the impacting elements. The fluid pockets can be arranged in square lattice array, radial array, or as concentric grooves for example.

In still another arrangement of my shock absorbing means where both sides thereof are so provided with pockets or cells and with dividing walls of substantial thickness, I contemplate that the dividing walls on one side of my shock absorbing means be laterally offset from the dividing walls on the other side thereof such that the resilient material of the shock absorbing means is subjected to considerable shear stresses upon impact so as to increase the resiliency and impact absorption thereof.

In still other arrangements, particularly in piston and cylinder apparatus, the shock absorbing means can be provided on both piston faces, for double-acting piston operation, by embedding the piston within the shock-absorbing means. Similarly the shock-absorbing means can be provided as one or two discrete members for quick-attach mounting on one or both piston faces. In any event the shock absorbing means can be provided with one or more integral sealing lips for sealing the piston to the juxtaposed cylinder wall during movements of the piston.

Alternatively, one or two of the shock absorbing members can be quick-attached to one or both cylinder end walls for engagement by the associated piston face or faces. In either case it is contemplated that the end wall member or members can be provided with integral sealing means for sealing one or both of the cylinder end walls to the body of the cylinder. I further contemplate providing one of the end wall shock-absorbing members with additional integral sealing means for sealing the passage of a piston rod therethrough.

In a specific embodiment of my invention, I provide a piston and cylinder arrangement wherein discoidal shock absorbing means are permanently mounted upon one or both inner end surfaces of the cylinder for contact by the piston, or alternatively, the shock absorbing means are permanently mounted on one or both sides of the piston for such purposes. It has been found that a major proportion of the thickness of the discoidal shock absorbing means can be embedded in the surface of the machine element on which the shock absorbing means are mounted, in view of the fact that my shock absorbing means can decelerate the piston within a very short distance while at the same time completely absorb the impacting forces between the piston and the associated end or ends of the cylinder. It will be made apparent, however, as this description proceeds that the physical dimensions of my shock absorbing means can be varied readily and within wide ranges to handle a wide range of impacting force as may be encountered in various applications of the invention.

During the foregoing description, various objects, features and advantages of the invention have been alluded to. These and other objects, features and advantages will be elaborated upon during the forthcoming description of certain presently preferred embodiments of the invention and presently preferred methods of practicing the same.

In the accompanying drawings, I have shown certain presently preferred embodiments of the invention and have illustrated presently preferred methods of practicing the same wherein:

FIGURE 1 is a longitudinally sectioned view of a novel piston and cylinder arrangement provided in accordance with the invention with my shock absorbing means;

FIGURE 2 is a cross-sectional view of the apparatus shown in FIGURE 1 and taken along reference line II—II thereof;

FIGURE 3 is a partial, longitudinally sectioned view of the apparatus shown in FIGURE 1 and taken along reference line III—III thereof, with the piston being shown in a position of engagement of the novel shock absorbing means with the cylinder head.

FIGURE 4 is an elevational view of a novel double-action piston and cylinder arrangement provided in accordance with the invention with shock absorbing means on both sides of the piston;

FIGURE 5 is an isometric view of another form of the novel shock absorbing means of the invention;

FIGURE 6 is an enlarged, partial, cross-sectional view of the shock absorbing means illustrated in FIGURE 5 and taken along reference line VI—VI thereof;

FIGURE 7 is a similar cross-sectional view of the shock absorbing means illustrated in FIGURE 5 but taken along reference line VII—VII thereof;

FIGURE 10 is a partial, longitudinally sectioned view of still another form of my novel apparatus;

FIGURE 11 is a partial, cross-sectional view of the apparatus as shown in FIGURE 10 and taken along reference line XI—XI thereof;

FIGURE 12 is a partial, longitudinally sectioned view of still another form of my invention;

FIGURE 13 is an enlarged, partial longitudinally sectioned view showing in detail one of the sealing members of FIGURE 12; and FIGURE 14 is a partial, longitudinally sectioned view of yet another form of my invention.

Figure 9:
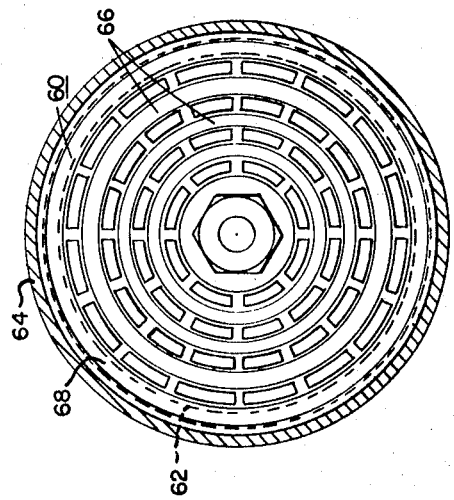
FIGURE 9 is a partial, cross-sectional view of the apparatus as shown in FIGURE 8.

Referring now to FIGURES 1 to 3 of the drawings, the exemplary form of the invention shown therein includes a cylinder 10 having a pair of end members 12 and 14 and a piston 16 closely fitted therein for the usual reciprocatory movements. The piston 16 is mounted in the usual fashion on a piston rod 18, which in this example extends through a closely fitted aperture therefor in one of the end members or cylinder heads 12 and 14, for example the number 14. Suitable port structures are coupled for example to the latter end member for the introduction and exhaustion of a suitable actuating fluid.

In a piston-cylinder arrangement as thus far described it is well known that the sudden application of differential pressure across the piston 16, for example, of a sense to move the piston through area 20 of the cylinder 10 will cause the adjacent face 22 of the piston in such case to impact against the associated inner end wall 24 of the cylinder 10.

In accordance with the invention, shock absorbing means are associated with one of the piston surface 22 and end wall surface 24 to absorb the impacting energies to prevent violent contact between the piston surface 22 and the end wall 24 during operation of the piston and cylinder arrangement 10–16. In this example, shock absorbing means 28 are mounted on the piston surface 22 and desirably are partially embedded therein. In this arrangement of the invention each side of the shock absorbing means, which is provided in this example in the form of an annular disc or pad, is provided with a plurality of pockets or cells 30 or 32 as better shown in FIGURES 2 and 3 of the drawings.

As shown in FIGURES 1 to 3 the major proportion of the thickness of the pad or disc 28 can be embedded within the piston surface 22, or alternatively (not shown) in the end wall surface 24. Accordingly, deceleration is not applied by the shock absorbing means 28 until the machine elements, i.e., the piston 16 and the wall or head 24 of the cylinder, are very close to their impacting positions as denoted by the chain outline position 34 of the piston 16 of FIGURE 1. Thus, movements of the piston 16 are otherwise unimpeded by the shock absorbing means, the manual operating characteristics of the piston and cylinder are not changed, and the load-carrying capacity thereof is increased.

When the cylinder end wall 24 is contacted by the exposed adjacent surface of the shock absorbing disc 28, the pockets 30 and 32 having air or other environmental media therein are respectively engaged and sealed by forceful contact with the adjacent surfaces 24 and 36 of the cylinder end member 14 and of the piston recess 38 respectively. This sealing engagement entraps the air or other media within the pockets 30 and 32 and quickly decelerates the piston 16 either before it contacts the end member 14 or as such contact does occur without the development of serious impacting force.

In furtherance of this purpose, the shock absorbing pad 28 is closely fitted within the piston recess 38 and its central opening as better shown in FIGURES 2 and 3 is closely fitted about the piston hub 40. It will be understood, of course, that the outer periphery of the shock absorbing disc 28 and correspondingly the outer periphery of the outer recess 38 can be relatively reduced or extended from that shown in the drawings depending upon the extent of the impacting forces which are anticipated.

It is also contemplated that the pockets 30 and 32 can be made larger or smaller or spaced closer or farther apart as dictated by the impacting force which would otherwise be developed by the impacting machine elements. Desirably, however, the shock absorbing pad 28 is fabricated from a resilient or elastomeric material such as oil resistant neoprene so that the material itself, of the disc or pad, provides absorption of impacting forces.

For this purpose the relative hardness or softness of the material can be varied within wide limits again depending upon the extent of the anticipated impacting force. However, the material of the pad 28 is sufficiently resilient to effect complete and reliable sealing of the pockets 30 and 32 and to accommodate for this purpose any irregularities in the surfaces of the similar end wall 24 and of the recess bottom surface 36 of the piston 16.

The absorption of impact or shock energies is accomplished by the air or other media entrapped within the pockets or cells 30, 32 of the shock absorbing means 28 and by the resilient material from which the shock absorbing means is fabricated as it is compressed between the approaching machine elements. In operation, the approaching surfaces of the piston 16 and cylinder head 24, or of other impacting machine elements, seal the pockets of air or other media in the shock absorbing pad when the distance between these surfaces becomes less than the thickness of the pad. Then, as both the material of the pad and the air or other media in the pockets 30, 32 are rapidly compressed, the air or other media is forceably ejected from the pockets, which causes the impacting energies to be dissipated. Such air or other media is forced from the increasingly smaller but increasingly better sealed pockets 30, 32 of the shock absorbing means until equilibrium is reached. As a result the impacting energies of the approaching machine elements are dissipated by compression of the pad material and also by compression and displacement of the air or other media entrapped within the pockets of the pad.

Referring now to FIGURE 4 of the drawings, a double-acting piston 16' is illustrated and is provided with shock absorbing means in accordance with the invention, which are arranged for impact absorption with both ends (not shown), respectively, of the cylinder 10'. In this arrangement each side of the piston 16' is provided with a recess 38' or 42 respectively, in which is seated a shock absorbing disc 28' or 44 respectively. The shock absorbing discs 28' and 44 are constructed as described previously or alternatively as described below in reference to FIGURES 5 and 6 of the drawings. The disc 44 need not, however, be provided with a central opening in the absence of a piston rod connection. The piston and cylinder arrangement of FIGURE 4 thus functions similarly to that described in connection with the preceding figures save that impact absorption occurs at either end of the cylinder 10'.

Referring now to FIGURES 5 to 7 of the drawings, another exemplary form of the shock absorbing means of the invention are illustrated therein. In this arrangement of the invention the longitudinally and transversely dividing walls 46 and 48 respectively on one side of the disc 50 (FIGURE 5) are each laterally offset from the longitudinal and transverse dividing walls 52 and 54 respectively of the other side of the disc 50, as better shown in FIGURES 6 and 7. This arrangement subjects the body portions 56 of the disc 50 which lie between the offset longitudinal walls 46, 52 (FIGURE 6) and body portions 58 between the offset transverse walls 48, 54 (FIGURE 7) to considerable shear force when the shock absorbing pad 50 is engaged by impacting machine elements. The shear stresses developed in the body portions 56–58 increase the impact absorption-ability of the resilient material from which the shock absorbing disc 50 is formed and with the pockets 32', 34' provide excellent means of total impact absorption. In this arrangement, the resilient material can be relatively hard for example of the order of 70 durometer hard, owing to the application of shearing stresses therein as aforesaid. The shock absorbing means of FIGURES 5–7 therefore permit the absorption of extremely large impacting forces within a very short distance of movement of one or both of the impacting machine elements.

Figure 8:
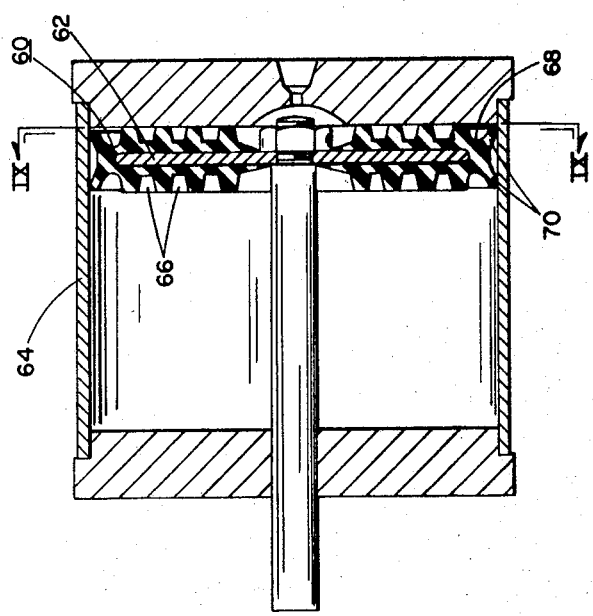
FIGURE 8 is a partial, longitudinally sectioned view of still another piston and cylinder arrangement provided in accordance with my invention.

In FIGURES 8 and 9 of the drawings another arrangement of my shock or impact absorbing means 60 is shown in which is embedded a double acting piston 62 for reciprocation within cylinder 64. The piston 62 can be embedded within the shock absorbing means 60 by molding the material comprising the shock absorbing means 60 therearound in accordance with conventional practices. In this arrangement each side of the shock absorbing means 60 is provided with a radial array of pockets 66 for entrapping air and other fluid utilized within the cylinder 64, for the purposes discussed previously.

Adjacent the outer circumferential edge of the shock absorbing means 60 a groove 68 is formed on each side thereof in order to define a pair of oppositely disposed sealing lips 70 for purposes of sealing the piston 62 to the inner wall surfaces of the cylinder 64 in either direction of piston reciprocation. The shock absorbing means 60 therefore is provided with integral sealing means.

A somewhat similar arrangement is illustrated in FIGURES 10 and 11. In the latter form of my invention, integral sealing and shock absorbing means 72 or 74 are secured separately to each side of double acting piston 76. In furtherance of this purpose each side of the piston 76 is provided with a rim 78 and groove 80 for coaction with corresponding and complementarily shaped portions of the sealing and shock absorbing means 72 or 74. The means 72 and 74 are thus snapped around the rims 78 of the piston 76 to retain the sealing and shock absorbing means thereon. This arrangement permits facile replacement of the sealing and shock absorbing means 72, 74 or either one of them separately in the event of unequal wearing characteristics therein. Each of the sealing and shock absorbing means 72, 74 are provided with radial arrays of fluid retaining pockets 82 and 84, as better shown in FIGURE 11, for the purposes described previously with reference to FIGURES 1–7 of the drawings.

Another arrangement of my shock absorbing means, denoted generally by reference character 86, is illustrated in FIGURES 12 and 13 of the drawings. In the latter arrangement a plurality of concentric, circumferential grooves 88 are formed in a cylinder end wall 90 where they surround piston rod 92 in this example. A like number of sealing members 94 are fitted within the grooves 88 but project therefrom for shock absorbing engagement with apposing face 96 of piston 98. The sealing members 94 are fabricated from a resilient material, as is the case of the other shock absorbing means described herein, and therefore, entrap fluid employed within cylinder 100 in pockets 102 formed between individual sealing members 94, and between the innermost member 94 and the piston rod 92, the passage of which through end wall 90 is sealed by O-ring 104. In the arrangement of FIGURES 12 and 13 the pockets 102 are continuous and in this example circular but otherwise entrap fluid therein to afford shock or impact absorption as described previously.

As better shown in FIGURE 13 each of the sealing members 94 is provided with means for aiding the sealing action between the sealing members and the end wall member 90 on the one hand and the juxtaposed piston face 96 on the other. Thus, each of the sealing members 94 is tapered toward its projecting edge as denoted by reference character 106, and a sealing groove 108 is formed in the projecting edge which in turn defines a pair of circumferentially extending projections 110 for sealing engagement by the apposed piston face 96. This sealing engagement aids in confining the fluid within the continuous fluid-entrapping grooves 102.

Leakage between the sealing members 94 and the wall member grooves 88 is effectively prevented by means of a pair of lateral grooves 112 formed one on each side of each sealing member 94 as likewise better shown in FIGURE 13. Each of the lateral grooves 112 thus defines a pair of sealing projections 114 on each side of each sealing member 94 for engagement with the adjacent side walls of the wall member grooves 88. The side grooves 112 also facilitate compression of the sealing members 94 so as to permit a substantially simultaneous sealing engagement between the sealing members 94 and the apposed piston face 96, in the event that the sealing members 94 may initially project different distances inwardly of the wall member 90 as a result of manufacturing tolerances or the like. It will be understood of course that the shock absorbing means 86 can alternatively be provided on one or both faces of the piston 98 for engagement with an adjacent end wall of the cylinder 100.

Referring now to FIGURE 14 of the drawings another stationary sealing and shock absorbing means 72' is mounted on one or both end walls, for example end wall 116 of a cylinder 118 for impacting engagement by piston 120. In this arrangement the end wall sealing and shock absorbing means 72' is generally similar to that shown in FIGURE 10 of the drawings and thus is provided with fluid pockets 82' and 84'. Additionally the sealing and shock absorbing means 72' are provided with inner and outer circumferential grooves 122 and 124, which respectively define inner and outer sealing lips 126 and 128 for sealing engagement with piston rod 130 and inner wall surface 132 of the cylinder 118. Accordingly, the conventional O-rings, such as O-ring 104 and O-ring 134 (FIGURE 12) usually provided between the cylinder end wall 116 and piston rod 130 and cylinder wall surface 132 can be omitted.

The fluid entrapping pockets of FIGURES 8–11 and 14 can be formed on either side of the associated shock absorbing means as described in connection with FIGURES 6 and 7, or on both sides for example as set forth in FIGURES 1–4 where the pockets on each side of the shock or impact means are longitudinally aligned, or alternatively as set forth in FIGURE 5 where the pockets are longitudinally offset. It is also contemplated that the fluid entrapping pockets of FIGURES 8–11 and 14 can be formed in a square lattice array as shown in FIGURES 2 and 5 or other suitable configuration.

The shock absorbing means as described herein are highly advantageous in that they provide effective, reliable and repetitive cushioning for high inertial loads in piston and cylinder arrangements and in or between other impacting elements. This is accomplished at low cost and without increasing the complexity or the physical size of the related machinery. Moreover, the shock absorbing means require little or no maintenance and do not occupy space outside of the piston and cylinder arrangement or other impacting machine elements and very little space within or between such elements.

From the foregoing it will be apparent that novel and efficient forms of shock absorbing means and machine elements adapted for use therewith have been disclosed herein. While I have shown and described certain presently preferred embodiments of the invention and have shown presently preferred methods of practicing the same, it is to be distinctly understood that the invention is not limited thereto but may be otherwise variously embodied and practiced.

I claim:

1. A piston and cylinder arrangement comprising a cylinder having a piston and piston rod mounted for reciprocation therein, said cylinder having end wall members at least one of which is engageable by the adjacent face of said piston at the end of the piston stroke, and impact absorbing means mounted on one of said end wall and said adjacent piston face, said impact absorbing means being fabricated from a resilient material and having a plurality of pockets in at least one side surface being compressibly and sealably engageable with the associated one of said end wall and said piston face in order to entrap environmental media therein so that the impacting energies developed between said piston and said one end wall adjacent the end of said piston stroke are absorbed by said impacting absorbing means, said impact absorbing means being of annular discoidal configuration and mounted on said piston face for closely fitted engagement therewith and about said piston rod.

2. A piston and cylinder arrangement comprising a cylinder having a piston and piston rod mounted for reciprocation therein, said cylinder having end wall members at least one of which is engageable by the adjacent face of said piston at the end of the piston stroke, and impact absorbing means mounted on one of said end wall and said adjacent piston face, said impact absorbing means being fabricated from a resilient material and having a plurality of pockets in at least one side surface being compressibly and sealably engageable with the associated one of said end wall and said piston face in order to entrap environmental media therein so that the impacting energies developed between said piston and said one end wall adjacent the end of said piston stroke are absorbed by said impacting absorbing means, said impact absorbing means being of discoidal configuration and mounted in a recess therefor formed on said piston face.

3. A piston and cylinder arrangement comprising a cylinder having a piston and piston rod mounted for reciprocation therein, said cylinder having end wall members at least one of which is engageable by the adjacent face of said piston at the end of the piston stroke, and impact absorbing means mounted on one of said end wall and said adjacent piston face, said impact absorbing means being fabricated from a resilient material and having a plurality of pockets in at least one side surface being compressibly and sealably engageable with the associated one of said end wall and said piston face in order to entrap environmental media therein so that the impacting energies developed between said piston and said one end wall adjacent the end of said piston stroke are absorbed by said impacting absorbing means, said impact absorbing means including an impact member mounted on said piston face, said piston is a double-acting piston, and an additional impact absorbing member mounted on the other face of said piston for engagement with the other of said cylinder end walls.

4. The combination according to claim 3 wherein said impact absorbing members are partially embedded in closely fitted recesses therefor and formed in said piston faces respectively.

5. In a machine, the combination comprising a pair of impacting machine elements, means for moving said machine elements together with impacting force, resilient impact absorbing means having opposing side surfaces shaped for complementary engagement respectively with juxtaposed surfaces of said impacting machine elements, means for mounting said impacting means on one of said juxtaposed surfaces, at least one of said opposed side surfaces having a plurality of pockets therein for the entrapment of environmental media upon impacting engagement with the adjacent machine element surface, the material of said impact means being capable of sealing engagement with said adjacent machine element surface to effect said entrapment, said impact means including a plurality of substantially concentric and radially closely spaced resilient members secured to one of said machine element surfaces and projecting therefrom for simultaneous engagement with the other of said machine element surfaces upon relative impacting movement of said machine elements to entrap portions of said environmental media between said members, and sealing means co-extending with said members mounted thereon for sealing said members to said machine elements, said sealing means including groove means formed on each of said members and defining sealing ridges for engagement with adjacent surfaces of at least one of said machine elements.

6. A piston and cylinder arrangement comprising a cylinder having a piston and piston rod mounted for reciprocation therein, said cylinder having end wall members at least one of which is engageable by the adjacent face of said piston at the end of the piston stroke, and impact absorbing means mounted on one of said end wall and said adjacent piston face, said impact absorbing means being fabricated from a resilient material and having a plurality of pockets in at least one side surface being compressibly and sealably engageable with the associated one of said end wall and said piston face in order to entrap environmental media therein so that the impacting energies developed between said piston and said one end wall adjacent the end of said piston stroke are absorbed by said impacting absorbing means, said impact absorbing means being mounted on said piston and including a sealing lip mounted thereon adjacent the outer peripheral edge of said piston for sealing engagement with the adjacent cylinder wall.

7. A piston and cylinder arrangement comprising a cylinder having a piston and piston rod mounted for reciprocation therein, said cylinder having end wall members at least one of which is engageable by the adjacent face of said piston at the end of the piston stroke, and impact absorbing means mounted on one of said end wall and said adjacent piston face, said impact absorbing means being fabricated from a resilient material and having a plurality of pockets in at least one side surface being compressibly and sealably engageable with the associated one of said end wall and said piston face in order to entrap environmental media therein so that the impacting energies developed between said piston and said one end wall adjacent the end of said piston stroke are absorbed by said impacting absorbing means, said impact absorbing means being provided on each face of said piston, and a pair of opposed sealing lips integrally formed with said impact absorbing means and disposed adjacent the outer peripheral edge of said piston for engagement with the adjacent surfaces of said cylinder.

8. The combination according to claim 7 wherein said piston is substantially embedded within said impact absorbing means.

9. A piston and cylinder arrangement comprising a cylinder having a piston and piston rod mounted for reciprocation therein, said cylinder having end wall members at least one of which is engageable by the adjacent face of said piston at the end of the piston stroke, and impact absorbing means mounted on one of said end wall and said adjacent piston face, said impact absorbing means being fabricated from a resilient material and having a plurality of pockets in at least one side surface being compressibly and sealably engageable with the associated one of said end wall and said piston face in order to entrap environmental media therein so that the impacting energies developed between said piston and said one end wall adjacent the end of said piston stroke are absorbed by said impacting absorbing means, said impact absorbing means including an impact absorbing member snap-fitted to at least one face of said piston.

10. The combination according to claim 9 wherein said impact absorbing member includes an outer peripheral sealing lip disposed for sealing engagement with the adjacent wall surface of said cylinder during movement of said piston therein.

11. A piston and cylinder arrangement comprising a cylinder having a piston and piston rod mounted for reciprocation therein, said cylinder having end wall members at least one of which is engageable by the adjacent face of said piston at the end of the piston stroke, and impact absorbing means mounted on one of said end wall and said adjacent piston face, said impact absorbing means being fabricated from a resilient material and having a plurality of pockets in at least one side surface being compressibly and sealably engageable with the associated one of said end wall and said piston face in order to entrap environmental media therein so that the impacting energies developed between said piston and said one end wall adjacent the end of said piston stroke are absorbed by said impacting absorbing means, said impact absorbing means being mounted on said cylinder end wall, said impact means having an outer peripheral sealing lip disposed in sealing engagement with an inner cylindrical wall surface of said cylinder to seal said end wall to said surface.

12. The combination according to claim 11 wherein said end wall and said impact absorbing means are provided with aligned apertures therein for passage of a piston rod therethrough, and said impact absorbing means are provided with an inner peripheral sealing lip adjacent the aperture thereof for sealing engagement of said impact means with said piston rod during movement of the latter.

References Cited

UNITED STATES PATENTS

| | | | |
|---|---|---|---|
| 2,032,114 | 3/1936 | Clements | 161—73 |
| 730,309 | 6/1903 | Steven | 92—249 X |
| 2,724,588 | 11/1955 | Sheets | 267—35 |
| 2,899,936 | 8/1959 | Edmund | 92—85 |
| 2,981,232 | 4/1961 | Peras | 92—85 X |
| 2,984,529 | 5/1961 | Dailey | 92—85 X |
| 3,026,224 | 3/1962 | Rogers. | |
| 3,049,344 | 8/1962 | Hawkins. | |
| 3,136,228 | 6/1964 | Dailey | 92—85 |
| 3,176,595 | 4/1965 | Schwartz | 92—249 X |
| 3,231,256 | 1/1966 | Olson. | |
| 3,255,675 | 6/1966 | Reve et al. | 92—85 X |

FOREIGN PATENTS

| | | |
|---|---|---|
| 1,180,195 | 10/1964 | Germany. |
| 486,050 | 10/1953 | Italy. |

MARTIN P. SCHWADRON, Primary Examiner

IRWIN C. COHEN, Assistant Examiner

U.S. Cl. X.R.

92—168, 249; 267—1